US011626837B2

(12) United States Patent
Yu et al.

(10) Patent No.: US 11,626,837 B2
(45) Date of Patent: Apr. 11, 2023

(54) PHOTOVOLTAIC SYSTEM AND METHOD FOR LOCATING DEVICES IN PHOTOVOLTAIC STRING

(71) Applicant: Sungrow Power Supply Co., Ltd., Hefei (CN)

(72) Inventors: Yanfei Yu, Anhui (CN); Xiaoxun Li, Anhui (CN); Anying Jiang, Anhui (CN); Xinyu Wang, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 58 days.

(21) Appl. No.: 17/404,007

(22) Filed: Aug. 17, 2021

(65) Prior Publication Data

US 2022/0069769 A1 Mar. 3, 2022

(30) Foreign Application Priority Data

Aug. 26, 2020 (CN) .......................... 202010869779.6

(51) Int. Cl.
*H02S 50/00* (2014.01)
*H02J 13/00* (2006.01)
(Continued)

(52) U.S. Cl.
CPC .............. *H02S 50/00* (2013.01); *H02J 3/381* (2013.01); *H02J 13/00006* (2020.01);
(Continued)

(58) Field of Classification Search
CPC ..... H02S 50/00; H02J 13/00006; H02J 3/381; H02J 2300/26; H02J 13/00; H02J 3/38; H02H 7/20; H02H 3/158
See application file for complete search history.

(56) References Cited

U.S. PATENT DOCUMENTS

| 2017/0176504 A1 | 6/2017 | Charles et al. |
| 2018/0034411 A1 | 2/2018 | Charles et al. |
| 2018/0278206 A1 | 9/2018 | Tan et al. |

FOREIGN PATENT DOCUMENTS

| CN | 109039277 A | 12/2018 |
| EP | 3 667 902 A1 | 6/2020 |

(Continued)

OTHER PUBLICATIONS

EP21192101.0, Jan. 12, 2022, Extended European Search Report.
(Continued)

*Primary Examiner* — Robert L Deberadinis
(74) *Attorney, Agent, or Firm* — Wolf, Greenfield & Sacks, P.C.

(57) ABSTRACT

A photovoltaic system and a method for locating devices in a photovoltaic string. A communication host in the photovoltaic system acquires accumulated operation durations of MLPE apparatuses of the photovoltaic string, ranks the accumulated operation durations to obtain a ranking result, and determines a physical location of each device in the photovoltaic string according to the ranking result and a sequence of installing positions of the devices, where the devices are installed at the installing positions based on the sequence. It is not necessary to paste label codes on the MLPE apparatuses, or record serial numbers of the MLPE apparatuses by installation personnel. Operation processes are simplified, operation time is saved, and labor costs are reduced.

20 Claims, 8 Drawing Sheets

(51) Int. Cl.
  *H02J 3/38* (2006.01)
  *H02H 7/20* (2006.01)
  *H02M 3/158* (2006.01)

(52) U.S. Cl.
  CPC ............ *H02H 7/20* (2013.01); *H02J 2300/26* (2020.01); *H02M 3/158* (2013.01)

(56) References Cited

FOREIGN PATENT DOCUMENTS

| | | | |
|---|---|---|---|
| JP | 2013-162627 | A | 8/2013 |
| JP | 2015-121870 | A | 7/2015 |
| JP | 2016-082716 | A | 5/2016 |
| JP | 2016-136802 | A | 7/2016 |
| JP | 2017-513452 | A | 5/2017 |
| JP | 2020-005423 | A | 1/2020 |
| JP | 2020-099190 | A | 6/2020 |

OTHER PUBLICATIONS

First Office Action for Japanese Application No. 2021-135727, dated Aug. 2, 2022.
Extended European Search Report for European Application No. 21192101.0, dated Jan. 12, 2022.

PHOTOVOLTAIC SYSTEM AND METHOD FOR LOCATING DEVICES IN PHOTOVOLTAIC STRING

The present disclosure claims the priority to Chinese Patent Application No. 202010869779.6, titled "PHOTOVOLTAIC SYSTEM AND METHOD FOR LOCATING DEVICES IN PHOTOVOLTAIC STRING", filed on Aug. 26, 2020 with the China National Intellectual Property Administration, the content of which is incorporated herein by reference.

FIELD

The present disclosure relates to the technical field of photovoltaic power generation, and in particular to a photovoltaic system and a method for locating devices in a photovoltaic string.

BACKGROUND

At present, module level power electronics (MLPE) apparatuses are increasingly widespread in photovoltaic systems. The MLPE apparatus may be configured to perform maximum power point tracking, rapid shutdown, data collection, data monitoring, or other operations on a photovoltaic module.

Generally, one or more photovoltaic modules are provided with one MLPE apparatus, and there is a large quantity of MLPE apparatuses in a photovoltaic system. In order to facilitate post-installation operations such as maintenance, it is necessary to acquire an accurate position of each MLPE apparatus.

In conventional technology, a corresponding label code (for example, a two-dimensional code, or a bar code) is usually pasted on each MLPE apparatus. When installing the MLPE apparatuses, installation personnel tear off the label code from each MLPE apparatus, and paste the label code on a piece of paper on which a position of the MLPE apparatus is marked. After all MLPE apparatuses are installed, the installation position of each MLPE apparatus is recorded into an upper computer according to the piece of paper on which the label codes are pasted.

The above method for determining installation positions of MLPE apparatuses in conventional technology is complex, resulting in long operation time and high labor costs.

SUMMARY

In view of the above, a photovoltaic system and a method for locating devices in a photovoltaic string are provided according to embodiments of the present disclosure. Addressed are problems of long operation time, complex processes, and high labor costs in determining a physical position of each MLPE apparatus in conventional technology.

In order to achieve the above object, following technical solutions are provided according to embodiments of the present disclosure.

A method for locating devices in a photovoltaic string is provided according to a first aspect of the present disclosure. The method includes: acquiring, by a communication host in a photovoltaic system, accumulated operation durations of MLPE apparatuses; ranking, by the communication host, the accumulated operation durations to obtain a ranking result; and determining, by the communication host, a physical location of each of the devices in the photovoltaic string, according to the ranking result and a sequence of installing positions of the devices in the photovoltaic string, where the devices are installed at the installing positions based on the sequence.

In an embodiment, before the communication host acquiring the accumulated operation durations of all MLPE apparatuses, the method further includes: stopping, by the MLPE apparatuses synchronously, timing the accumulated operation durations.

In an embodiment, stopping, by the MLPE apparatuses synchronously, timing the accumulated operation durations includes: stopping, by the MLPE apparatuses synchronously, timing the accumulated operation durations in response to detecting a timing-stop signal.

In an embodiment, the timing-stop signal is at least one of: a change in an output voltage, a change in an output current, a short-circuit connection, or a preset communication signal.

In an embodiment, the timing-stop signal is generated by a converter, a switch device, a synchronization device, the communication host, or a power grid, which is in a post-stage of the MLPE apparatuses of the photovoltaic system.

In an embodiment, the timing-stop signal is the short-circuit connection, and is generated by shorting a converter, shorting a switch device, or shorting the photovoltaic string.

In an embodiment, after the MLPE apparatuses stopping timing the accumulated operation durations synchronously, the method includes: determining, by the MLPE apparatuses, whether a timing-start signal is detected; resuming, by the MLPE apparatuses, timing the accumulated operation durations in response to determining that the timing-start signal is detected; and stopping, by the MLPE apparatuses synchronously, timing the accumulated operation durations in response to determining that the timing-stop signal is detected again.

In an embodiment, before the communication host acquiring the accumulated operation durations of the MLPE apparatuses, the method further includes: starting, by each MLPE apparatus, timing the accumulated operation duration in response to detecting a timing-start signal.

In an embodiment, each MLPE apparatus detects the timing-start signal by at least one of: detecting a predetermined electric change, being subject to a predetermined mechanical change, or receiving a preset signal through communication.

In an embodiment, the predetermined electric change includes: being powered, a change of an electric parameter at an input terminal, or a change of an electric parameter at an output terminal.

In an embodiment, the predetermined mechanical change includes: a predetermined component being installed or removed, a predetermined component being connected or disconnected, or a state of a predetermined component being changed.

In an embodiment, the preset signal is a signal for activating said MLPE apparatus.

In an embodiment, after the MLPE apparatuses stopping synchronously timing the accumulated operation durations and before the communication host acquiring the accumulated operation durations of the MLPE apparatuses, the method further includes: reporting, by the MLPE apparatuses, the accumulated operation durations respectively according to a predetermined rule.

In an embodiment, the predetermined rule is a sequence determined by each MLPE apparatus waiting for a random period after stopping timing the respective accumulated operation duration.

In an embodiment, the predetermined rule is a sequence determined by each MLPE apparatus waiting for a corresponding preset period after stopping timing the respective accumulated operation duration.

In an embodiment, the corresponding preset period is determined by the respective accumulated operation duration of said MLPE apparatus, or a serial number of said MLPE apparatus.

In an embodiment, the predetermined rule is a sequence determined by: in response to the respective accumulated operation duration of one of the MLPE apparatuses being reported, each remaining MLPE apparatus determining a respective reporting time based on a difference in the respective accumulated operation duration between the one of the MLPE apparatuses and said remaining MLPE apparatus.

In an embodiment, the devices in the photovoltaic string are photovoltaic modules, or the MLPE apparatuses in a post-stage of photovoltaic modules.

A photovoltaic system is further provided according to a second aspect of the present disclosure, including a communication host and at least one photovoltaic string. The photovoltaic string includes multiple photovoltaic modules that are connected in parallel or series via corresponding MLPE apparatuses. The communication host is in communication connection with the MLPE apparatuses, and is configured to perform any aforementioned method for locating the devices in the photovoltaic string.

In an embodiment, outputs of the MLPE apparatuses in one of the at least one photovoltaic string are connected in parallel. The MLPE apparatuses are micro inverters.

In an embodiment, outputs of the MLPE apparatuses in one of the at least one photovoltaic string are connected in series. The MLPE apparatuses are power optimizers, rapid shutdown devices, or module monitors. The photovoltaic system further includes a converter, configured to receive and convert power from the at least one photovoltaic string.

In an embodiment, the communication host is a controller in the photovoltaic system, a near-end controller in communication connection with a controller in the photovoltaic system, or a remote server, a cloud server, or a display terminal in communication connection with a controller.

In an embodiment, the controller in the photovoltaic system is an independent system controller, or an internal controller of a converter.

The method for locating the devices in the photovoltaic string is provided according to embodiments of the present disclosure. The communication host in the photovoltaic system acquires the accumulated operation durations of the MLPE apparatuses of the photovoltaic string, and then ranks the accumulated operation durations to obtain the ranking result. The ranking result of the accumulated operation durations of the MLPE apparatuses of the photovoltaic corresponds to a sequence of installing positions of the devices in the photovoltaic string. Therefore, according to the ranking result and the sequence of the installing positions of the devices, the MLPE apparatuses can be mapped to the installing positions of the devices in the photovoltaic string, and a physical location of each of the devices in the photovoltaic string are determined accordingly. With the method according to embodiments of the present disclosure, it is not necessary to paste label codes on the MLPE apparatuses, or record serial numbers of the MLPE apparatuses by installation personnel. Operation processes are simplified, operation time is saved, and labor costs are reduced.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

FIG. 2 is a schematic diagram of a correspondence between ranked accumulated operation durations of MLPE apparatuses and a sequence of installing positions of photovoltaic modules in a method for locating the devices in a photovoltaic string according to an embodiment of the present disclosure;

FIG. 3 is a schematic diagram of another correspondence between ranked accumulated operation durations of MLPE apparatuses and a sequence of installing positions of photovoltaic modules in a method for locating the devices in a photovoltaic string according to an embodiment of the present disclosure;

FIG. 4 is a schematic diagram of another correspondence between ranked accumulated operation durations of MLPE apparatuses and a sequence of installing positions of photovoltaic modules in a method for locating the devices in a photovoltaic string according to an embodiment of the present disclosure;

DETAILED DESCRIPTION OF EMBODIMENTS

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

Herein the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

A method for locating devices in a photovoltaic string is provided according to an embodiment of the present disclosure. Addressed are problems of long operation time, complex processes, and high labor costs in determining a physical position of each MLPE apparatus in conventional technology.

Figure 1:
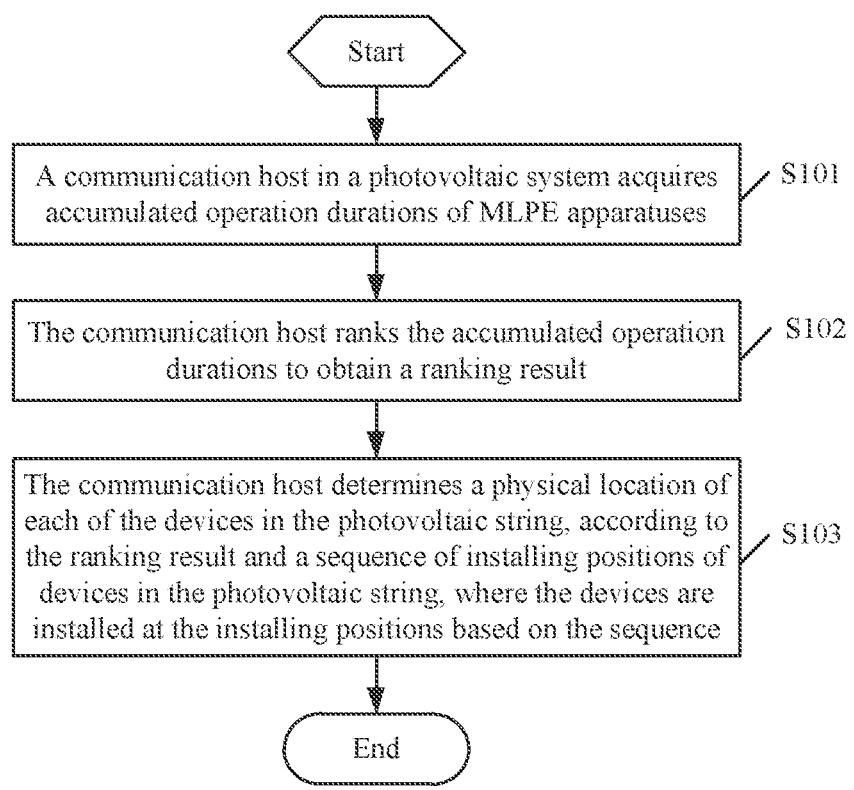
FIG. 1 is a flowchart of a method for locating devices in a photovoltaic string according to an embodiment of the present disclosure.

A flowchart of the method may be as shown in FIG. 1. The method includes steps S101 to S103.

In step S101, a communication host in a photovoltaic system acquires accumulated operation durations of the MLPE apparatuses.

The communication host may be a controller in the photovoltaic system, for example, an internal controller in a converter, or a system controller. Alternatively, the communication host may be a near-end controller in communication connection with the controller in the photovoltaic system, for example, a local personal computer (PC). Alternatively, the communication host may be an upper computer, a remote terminal, or a cloud server in communication connection with any aforementioned controller.

In practice, an input terminal of each MLPE apparatus of the photovoltaic system is connected to a photovoltaic module to acquire power. A program operated in the MLPE apparatus starts accumulating operation duration from a moment at which the MLPE apparatus is powered, and transmits the accumulated operation duration to the communication host in the photovoltaic system. Afterwards, the process goes to step S102.

In step S102, the communication host ranks the accumulated operation durations to obtain a ranking result.

Generally, the photovoltaic string may include multiple photovoltaic modules and multiple MLPE apparatuses. After the MLPE apparatuses of the photovoltaic string are installed, the communication host ranks the accumulated operation durations of the MLPE apparatuses to obtain the ranking result. It takes time to install each photovoltaic module and each MLPE apparatus. Therefore, the accumulated operation durations of the MLPE apparatuses are different. In one embodiment, the accumulated operation durations may be ranked in a descending order. As an example, the photovoltaic string includes 12 MLPE apparatuses sequentially numbered from 1 to 12, and a ranking result of accumulated operation durations of the 12 MLPE apparatuses may be #3, #9, #11, #4, #7. #5, #10. #8, #1, #12, #6, and #2. The present disclosure is not limited thereto. The accumulated operation durations may be alternatively ranked in an ascending order, which also falls within the protection scope of the present disclosure.

In step S103, the communication host determines a physical location of each of the devices in the photovoltaic string, according to the ranking result and a sequence of installing positions of devices in the photovoltaic string. The devices are installed at the installing positions based on the sequence.

Figures 2, 3, 4:
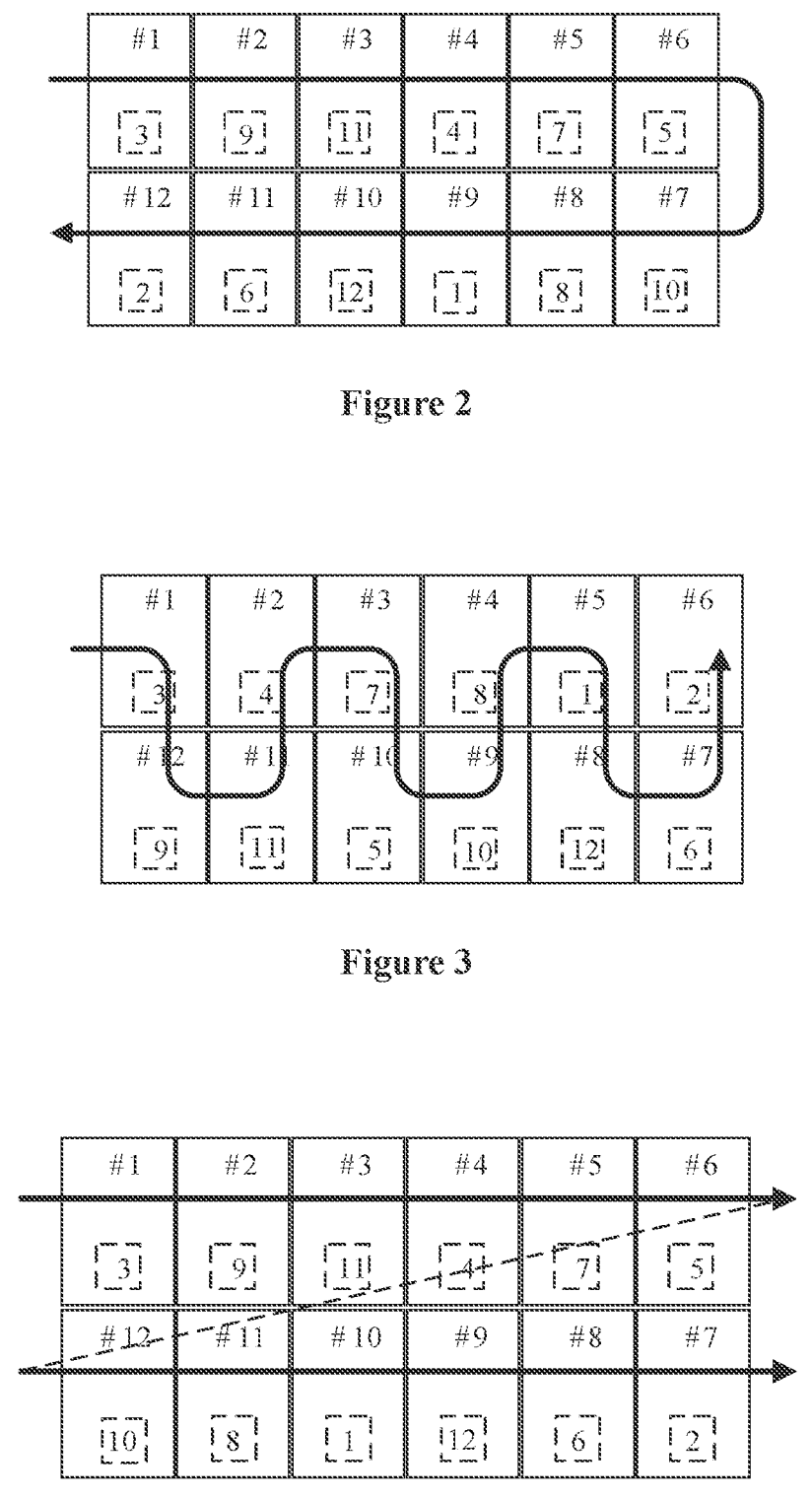

The devices in the photovoltaic string are photovoltaic modules or the MLPE apparatuses. In a photovoltaic system, arrangement of installing positions of the photovoltaic modules is usually designed in advance, and the photovoltaic modules are installed at the installing positions in a regular sequence. For example, during installation of the photovoltaic string, photovoltaic modules are installed based on a spatial sequence as #1, #2 . . . #12, and each photovoltaic module is installed with a MLPE apparatus. The present disclosure is not limited thereto. Those skilled in the art may apply other sequences when installing the photovoltaic modules, according to a practical requirement. The MLPE apparatuses may be mapped to the installing positions of the photovoltaic modules #1 to #12, according to the ranking result of the accumulated operation durations and the sequence of the installing positions of the photovoltaic modules (or the MLPE apparatuses). A correspondence is as shown in FIG. 2, where an arrow line indicates the sequence of the installing positions of the photovoltaic modules. Thereby, a physical location of each device (namely, each photovoltaic module or each MLPE apparatus) in the photovoltaic string can be determined.

The method for locating the devices in the photovoltaic string is provided according to embodiments of the present disclosure. The communication host in the photovoltaic system acquires the accumulated operation durations of the MLPE apparatuses of the photovoltaic string, and then ranks the accumulated operation durations to obtain the ranking result. The ranking result of the accumulated operation durations of the MLPE apparatuses of the photovoltaic corresponds to a sequence of installing positions of the devices in the photovoltaic string. Therefore, according to the ranking result and the sequence of the installing position of the devices, the MLPE apparatuses can be mapped to the installing positions of the devices in the photovoltaic string, and a physical location of each of the devices in the photovoltaic string are determined accordingly. With the method according to embodiments of the present disclosure, it is not necessary to paste label codes on the MLPE apparatuses, or record serial numbers of the MLPE apparatuses by installation personnel. Operation processes are simplified, operation time is saved, and labor costs are reduced.

A model of each photovoltaic string in a photovoltaic system, as shown in FIG. 2, may be established by an operator according to a practical requirement, through software running in the communication host which includes a display interface. For example, operations are performed on a display interface of a handheld tablet computer, a mobile phone, or a computer, on which a corresponding APP or a corresponding Web interface is provided. Photovoltaic modules may be dragged one by one according to an actual sequence of the installing positions, so as to establish the model of each photovoltaic string. Alternatively, all photovoltaic modules may be arranged first, and the installing positions of the photovoltaic modules may be sequenced by drawing with a gesture (such as the arrow line in FIG. 2). Alternatively, multiple diagrams of different installation sequences are stored in advance, and an operator selects the diagram of a target installation sequence.

Reference is made to FIG. 3 and FIG. 4, which show models of photovoltaic strings with different installation sequences. The arrow line indicates a sequence of installing positions of the photovoltaic modules (or the MLPE apparatuses corresponding to the photovoltaic modules). A correspondence between the MLPE apparatuses ranked based on accumulated operation durations and the fixedly arranged installation positions of the photovoltaic modules changes with the sequence of installing positions of the photovoltaic modules.

Figure 5:
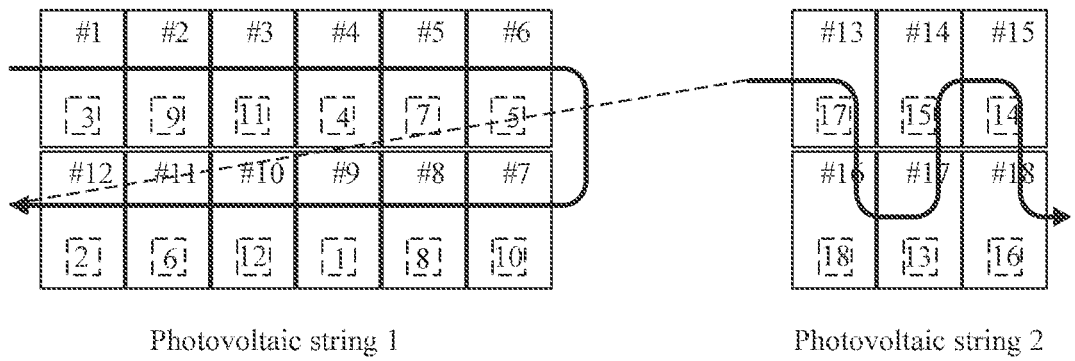
FIG. 5 is a schematic diagram of another correspondence between ranked accumulated operation durations of MLPE apparatuses and a sequence of installing positions of photovoltaic modules in a method for locating the devices in a photovoltaic string according to an embodiment of the present disclosure.

In a case that the photovoltaic system includes multiple photovoltaic strings, the photovoltaic string may serve as an operation unit when ranking the accumulated operation durations of the MLPE apparatuses and establishing correspondence between the photovoltaic modules and the MLPE apparatuses. A model of the photovoltaic string may refer to the model as shown in any one of FIG. 2 to FIG. 4. Alternatively, two photovoltaic strings may be operated together when ranking. For example, the photovoltaic system includes two photovoltaic strings, where a first photovoltaic string includes 12 photovoltaic modules #1 to #12 and 12 MLPE apparatuses #1 to #12, a second photovoltaic string includes photovoltaic modules #13 to #16 and MLPE apparatuses #13 to #16, and the first photovoltaic string is installed prior to the second photovoltaic string. Accumulated operation durations of all MLPE apparatuses in the two photovoltaic strings are ranked in a descending order, and the ranking result may be MLPE apparatuses #3, #9, #11, #4, #7, #5, #10, #8, #1, #12, #6, #2, #17, #18, #13. #15, #14, and #16. Such ranking result is mapped to a sequence of installing positions of all photovoltaic modules (or all MLPE apparatuses), and the obtained correspondence may be as shown in FIG. 5.

Figure 6:
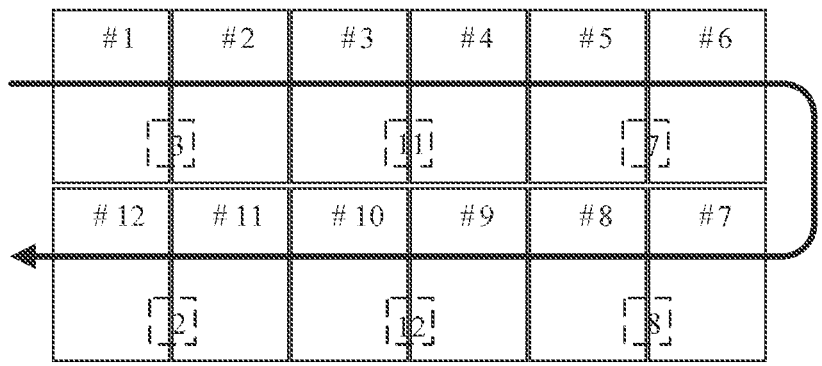
FIG. 6 is a schematic diagram of another correspondence between ranked accumulated operation durations of MLPE apparatuses and a sequence of installing positions of photovoltaic modules in a method for locating the devices in a photovoltaic string according to an embodiment of the present disclosure.

Analogy can be drawn to a case that multiple photovoltaic modules are connected to one MLPE apparatus, where a model of a photovoltaic string may be established in a similar manner. As shown in FIG. 6, each MLPE apparatus is connected to two photovoltaic modules. Each MLPE apparatus may be mapped to installing positions of the corresponding photovoltaic modules in the aforementioned manner. In such case, the position of each MLPE apparatus may be determined as installation positions of the two corresponding photovoltaic modules, in order to establish a more accurate correspondence.

Figure 7:
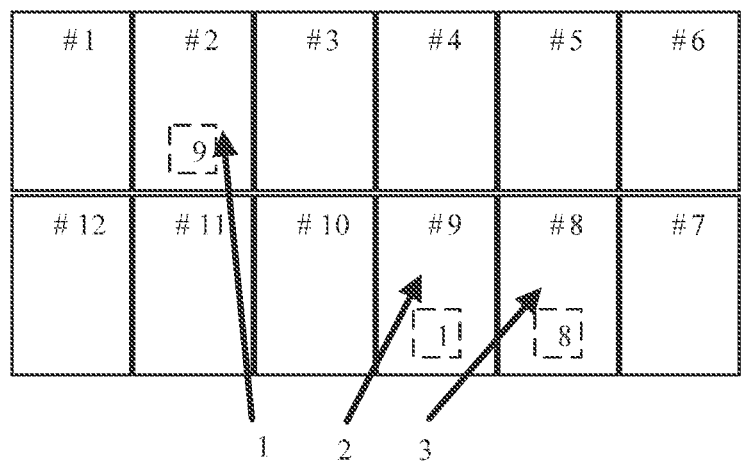
FIG. 7 is a schematic diagram of another correspondence between ranked accumulated operation durations of MLPE apparatuses and a sequence of installing positions of photovoltaic modules in a method for locating the devices in a photovoltaic string according to an embodiment of the present disclosure.

In another embodiment, a part rather than each of the photovoltaic modules in the photovoltaic string is installed with the MLPE apparatus. The above manner is stilled applicable in such case. Namely, the MLPE apparatuses are mapped to the installing positions of the corresponding photovoltaic modules according to the accumulated operation durations of the MLPE apparatuses. As shown in FIG. 7, only the photovoltaic modules #2, #9, and #8 is installed with the MLPE apparatuses, and these MLPE apparatuses are mapped to the installing positions of the photovoltaic modules #2, #9, and #8 according to a sequence of the three installing positions.

Figure 8:
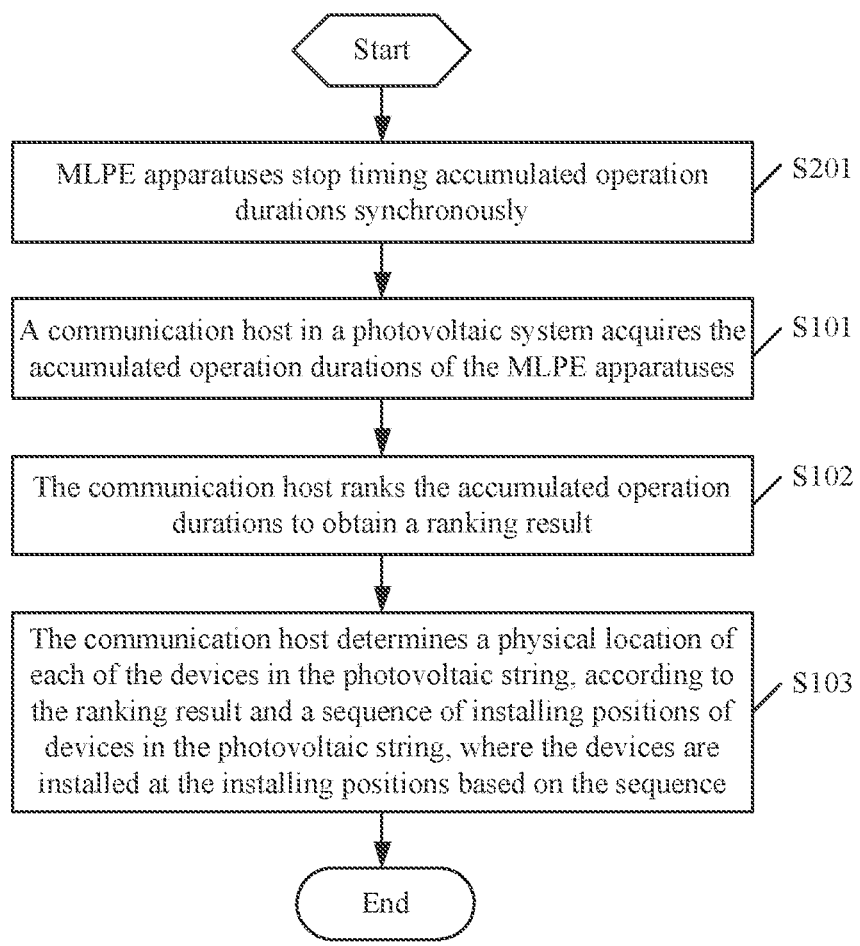
FIG. 8 is a flowchart of another method for locating devices in a photovoltaic string according to an embodiment of the present disclosure.

A method for locating devices in a photovoltaic string is further provided according to another embodiment of the present disclosure. A flowchart of the method is as shown in FIG. 8. On a basis of the method as shown in FIG. 1, the method further includes step S201, which is performed before the step S101.

In step S201, the MLPE apparatuses stop timing the accumulated operation durations synchronously.

The MLPE apparatuses are installed at different times, that is, the MLPE apparatuses start timing at different moments. After all MLPE apparatuses are installed, the MLPE apparatuses are controlled to stop timing the accumulated operation durations synchronously. Therefore, the accumulated operation durations of the MLPE apparatuses are different from each other, and can be ranked to acquire the ranking result.

The MLPE apparatuses may stop timing the accumulated operation durations synchronously in response to detecting a timing-stop signal. The timing-stop signal may be at least one of: a change in an output voltage, a change in an output current, a short-circuit connection, or a preset communication signal.

The timing-stop signal may be generated by a converter, a switch device, a synchronization device, the communication host, or a power grid, which is in a post-stage of the MLPE apparatuses of the photovoltaic system. Hereinafter the synchronization device is taken as an example, and controlling the MLPE apparatuses to stop timing the accumulated operation durations synchronously may include a following process.

Installation personnel connect the synchronization device to the photovoltaic string, after determining that all the MLPE apparatuses have been installed. The additional synchronization device applies a voltage or a current on the photovoltaic string, or transmits a triggering signal to the MLPE apparatuses, so as to trigger the MLPE apparatuses to stop timing the accumulated operation durations synchronously.

The synchronization device may be add-on equipment, which is only used in installing and debugging the system, and is removed after the system is installed and debugged.

In a case that the photovoltaic string or a converter in a post-stage of the MLPE apparatuses is connected to a power grid, the power grid may induce a change in voltage, current, frequency, or the like of the photovoltaic string. Further, in a case that the converter is connected to the power grid and starts operating, the power grid may induce a change of voltage, current, frequency, or the like of the photovoltaic string. Therefore, the timing-stop signal may also be generated due to connection with the power grid.

In a case that the timing-stop signal is the short-circuit connection, the timing-stop signal may be generated in one of following manners.

(1) The timing-stop signal is generated by shorting a converter in a post-stage of the MLPE apparatuses. For example, the converter in the post-stage of the MLPE apparatuses is a boost circuit, and a switch transistor in the boost circuit is turned on to short outputs of the photovoltaic string.

(2) The timing-stop signal is generated by shorting a switch device. For example, a switch device is installed between two cables of the photovoltaic string, and the switch device is switched on to short the photovoltaic string.

(3) The timing-stop signal is generated by shorting the photovoltaic string manually. For example, a male terminal and a female terminal on two cables of the photovoltaic string are coupled to form the short-circuit connection.

As an example, it is assumed that each MLPE apparatus outputs a preset voltage to a converter after being installed, for example, outputs a safe voltage around 1V. An output voltage of a photovoltaic string including 12 MLPE apparatuses connected in series is around 12V.

After receiving an input voltage around 12V, the converter transmits a prompt signal to the communication host, so as to inform the operator that the photovoltaic string has been installed.

After all MLPE apparatuses are installed, the converter or the switch device is shorted through software control, or the photovoltaic string is manually shorted by the operator, which may reduce the output voltage of the photovoltaic string to zero. The MLPE apparatuses stop timing the accumulated operation durations synchronously in response to detecting the short-circuit connection. In case of two photovoltaic strings, the two photovoltaic strings may be connected in an end-to-end manner, to form a large short-circuit loop. In such case, the accumulated operation durations of all MLPE apparatuses in the two photovoltaic strings may be ranked together.

Described above are only exemplary manners of triggering the MLPE apparatuses to stop timing the accumulated operation durations synchronously. The present disclosure is not limited thereto. Other manners of triggering the MLPE apparatuses to stop timing the accumulated operation durations synchronously also fall within the protection scope of the present disclosure.

There may be some special cases in practical application scenarios. For example, installation personnel only install a part of photovoltaic strings in one day, and time is insufficient for installing the remaining photovoltaic modules and MLPE apparatuses. In such case, the installed MLPE apparatuses of the photovoltaic string may be triggered to stop timing the accumulated operation durations synchronously, so as to prevent random nocturnal power-down from affecting the timing. Each installed MLPE apparatus records the accumulated operation duration thereof in such day. In a next day, the timing may be resumed by triggering the installed MLPE apparatuses to start timing again, before installing the remaining photovoltaic modules and MLPE apparatuses. That is, after the MLPE apparatuses stop timing the accumulated operation durations synchronously in step S201, the method may further includes followings two steps. The MLPE apparatuses determine whether a timing-start signal is detected. The MLPE apparatuses resume timing the accumulated operation durations in response to determining that the timing-start signal is detected. Finally, all the MLPE apparatuses in the photovoltaic string stop timing the accumulated operation durations synchronously, and each MLPE apparatus in the photovoltaic string acquires the accumulated operation durations thereof.

Other principles may refer to description of the aforementioned embodiments, and are not repeated herein.

Figure 9:
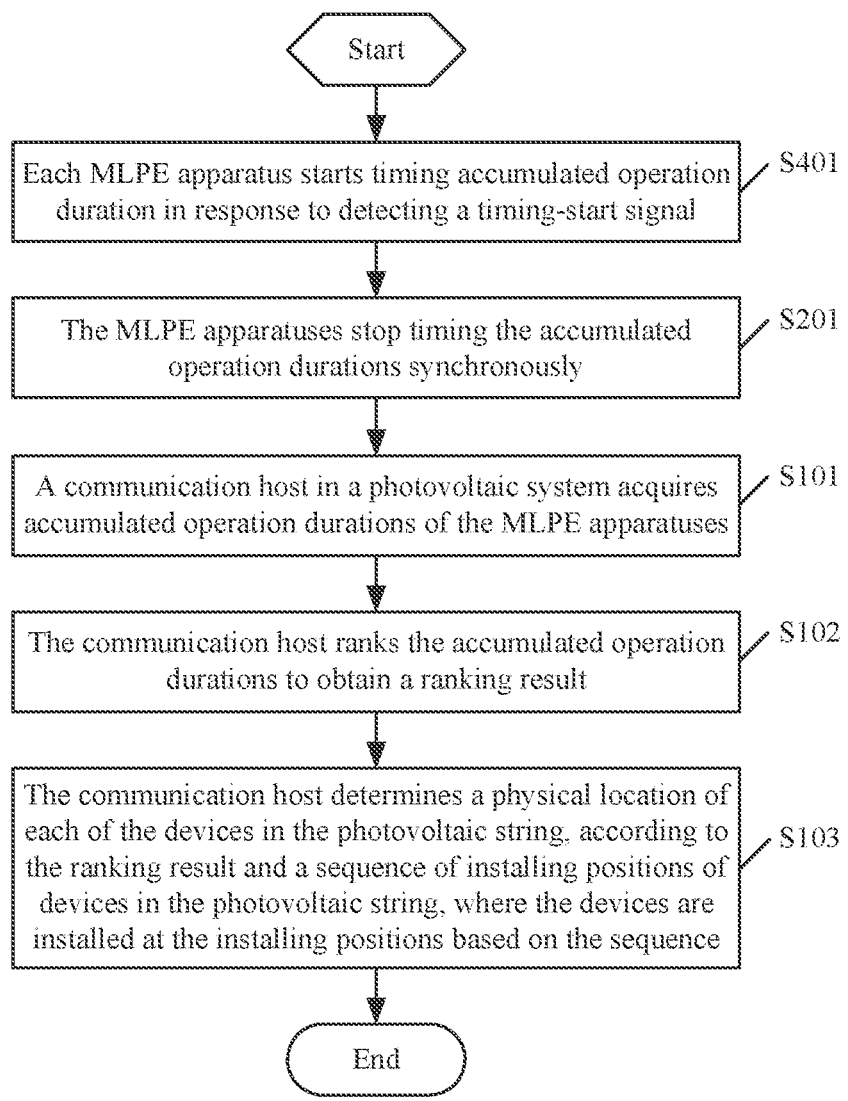
FIG. 9 is a flowchart of another method for locating devices in a photovoltaic string according to an embodiment of the present disclosure.

A method for locating devices in a photovoltaic string is further provided according to another embodiment in the present disclosure. The method further includes step S401, which is performed before the communication host in the photovoltaic system acquires the accumulated operation durations of the MLPE apparatuses (namely, the step S101). Reference is made to FIG. 9.

In step S401, each MLPE apparatus starts timing the accumulated operation duration in response to detecting a timing-start signal.

In the aforementioned embodiments, it may be set by default that each MLPE apparatus of the photovoltaic string starts timing immediately in response to being powered on, and each MLPE apparatus may acquire the accumulated operation duration thereof as long as the MLPE apparatuses stop timing synchronously. In some scenarios, various factors may result in inaccuracy in the acquired accumulated operation durations, when the MLPE apparatuses are only controlled to stop timing synchronously. For example, the MLPE apparatus may be pre-installed in the photovoltaic module before delivery, or the MLPE apparatus may be integrated in a junction box of the photovoltaic module. In such cases, the MLPE apparatus may be powered in response to being exposed to light, even before the photovoltaic module is transported to the installing position and installed.

In view of the above, the step S401 is performed before the step S101 in this embodiment. That is, each MLPE starts timing the accumulated operation duration when detecting the corresponding timing-start signal, and then the step S201 is performed, so as to acquire the accumulated operation durations of the MLPE apparatuses.

The timing-start signal is detectable by each MLPE apparatus during installation. In a photovoltaic system or a photovoltaic string, the MLPE apparatuses are installed at different moments. Each MLPE apparatus may be triggered to start timing the accumulated operation duration in response to detecting the timing-start signal at the moment of installation. Thereby, the MLPE apparatuses start timing at different moments.

Each MLPE apparatus detects the timing-start signal by at least one of: detecting a predetermined electric change, being subject to a predetermined mechanical change, or receiving a preset signal through communication.

The predetermined electric change may be being powered. For example, in a new photovoltaic system, the photovoltaic modules are usually installed on site together with the MLPE apparatuses. The MLPE apparatus is first fixed on a frame or a support of the photovoltaic module, and an input terminal of the MLPE apparatus is connected to the photovoltaic module. Therefore, the earlier an MLPE apparatus is installed, the earlier such MLPE apparatus is connected to a photovoltaic module, and the earlier such MLPE apparatus is powered and starts timing the accumulated operation duration. Different MLPE apparatuses are installed at different moments, and thereby record different accumulated operation durations.

A case of a reconstructed photovoltaic system is similar to the one of the new photovoltaic system. Photovoltaic modules have been installed in the reconstructed system. When adding MLPE apparatuses into the system, the earlier such MLPE apparatus is connected to a photovoltaic module, the earlier such MLPE apparatus is powered and starts timing the accumulated operation duration. Different MLPE apparatuses are installed at different moments, and thereby record different accumulated operation durations.

Alternatively, the predetermined electric change may be a change of an electric parameter at an input terminal or an output terminal. The electric parameter includes a voltage, a current, a frequency, or the like. For example, when a MLPE apparatus detects that an input voltage is greater than 20V, it is indicated that the MLPE apparatus has been installed on a photovoltaic module, and thereby the MLPE apparatus may start timing. For another example, when a MLPE apparatus detects that an output voltage is equal to 1V, it is indicated that the MLPE apparatus has been powered and in an initial state, and thereby the MLPE apparatus may start timing. Additionally or alternatively, an additional device may be configured to detect the change of the electric parameter at the input terminal or an output terminal of an MLPE apparatus may be detected, in order to trigger the MLPE apparatus to start timing. For example, an output terminal of the MLPE apparatus is provided with a voltage generator, and the voltage generator is configured to generate a voltage following a predetermined rule, so that the MLPE apparatus is capable to detect the voltage accurately.

In the case that the MLPE apparatus is pre-installed in the photovoltaic module before delivery or integrated in a junction box of the photovoltaic module, the MLPE apparatus may be powered in response to being exposed to light, even before the photovoltaic module is transported to the installing position and installed. Hence, the above manner of triggering timing based on the electric change, such as being powered, may not be applicable. In view of the above, the timing-start signal may be detected in response to the MLPE apparatus being subject to a predetermined mechanical change.

In practice, the predetermined mechanical change may be: a predetermined component being installed or removed, a predetermined component being connected or disconnected, or a state of a predetermined component being changed.

Examples of removing the predetermined component from the MLPE apparatus may be as follows. A plug configured to connect and disconnect two nodes in the MLPE apparatus is pre-installed in the MLPE apparatus before delivery. During installing the MLPE apparatus or the photovoltaic module in which the MLPE apparatus is pre-installed or integrated, the plug is temporarily or permanently removed to establish or break connection between the two nodes. The MLPE apparatus is triggered to start timing in response to detecting the connection between the two nodes being established or broken. Alternatively, the predetermined component may operate based on electromagnetic induction, for example, may be a magnetic strip or a component provided with a near field communication (NFC) chip. In response to the component being removed temporarily or permanently, the MLPE apparatus detects an internal change of a magnetic field or a communication signal, and the timing is triggered to start.

Examples of installing the predetermined component to the MLPE apparatus may be as follows. For example, a socket is reserved in the MLPE apparatus before delivery. During installing the MLPE apparatus or the photovoltaic module in which the MLPE apparatus is pre-installed or integrated, the timing is triggered to start in response to the component being inserted into the socket. The component may be provided in a package of the MLPE apparatus, or may be a conventional tool for on-site installation, such as a screwdriver. The component may be permanently removed or installed, in order to trigger the MLPE apparatus to start timing. Alternatively, the component may be temporarily removed or inserted once. For example, the screwdriver is inserted to the socket once and then pulled out immediately, to trigger the MLPE apparatus to start timing. Alternatively, the predetermined component may operate based on electromagnetic induction, for example, may be a magnetic strip or a component provided with a NFC chip. In response to the component being installed temporarily or permanently, the MLPE apparatus detects an internal change of a magnetic field or a communication signal, and the timing is triggered to start. The above components installed in or removed from the MLPE apparatus are only part of examples, and the present disclosure is not limited thereto.

An example of connecting the predetermined component of the MLPE apparatus may be as follows. Two output terminals of the MLPE apparatus or the photovoltaic module in which the MLPE apparatus is pre-installed or integrated are in a floating state when delivery. During installation, the two output terminals are transiently coupled with each other, which is detected by the MLPE apparatus, and thereby timing is triggered to start.

An example of disconnecting the predetermined component of the MLPE apparatus may be as follows. Two output terminals of the MLPE apparatus or the photovoltaic module in which the MLPE apparatus is pre-installed or integrated are shorted when delivery. During installation, the two output terminals disconnected from each other, which is detected by the MLPE apparatus, and thereby timing is triggered to start.

An example of a state of the predetermined component of the MLPE apparatus being changed may be as follows. A button, a knob, or a dial switch is reserved on an MLPE apparatus. During installation, a state of the button, the knob, or the dial switch is changed to trigger the MLPE apparatus to start timing.

Alternatively, each MLPE apparatus may detect the timing-start signal in response to receiving a preset signal indicating starting the timing, which is transmitted through communication. In practice, the preset signal may be transmitted from an external device. That is, each MLPE apparatus is triggered to start timing by an external communication signal. For example, the communication signal is generated by a portable device, such as a mobile phone or a smart wearable device with a communication function (for example, a smart bracelet, smart glasses, or a smart ring). The communication signal is transmitted to the MLPE apparatus to trigger the timing, by using a protocol suitable for communication over a short distance, such as the NFC or the Bluetooth, in response to the mobile phone or the smart wearable device with a communication function approaching the MLPE apparatus. The protocol suitable for communication over the short distance is advantageous in that triggering timing of one MLPE apparatus would not lead to erroneously triggering timing of another located nearby.

The aforementioned communication signal may further be configured as a signal for activating the MLPE apparatus. The MLPE apparatus may output a safe voltage before being activated, and may output normal power after being activated.

Other principles may refer to the description of the aforementioned embodiments, and are not repeated herein.

Figure 10:
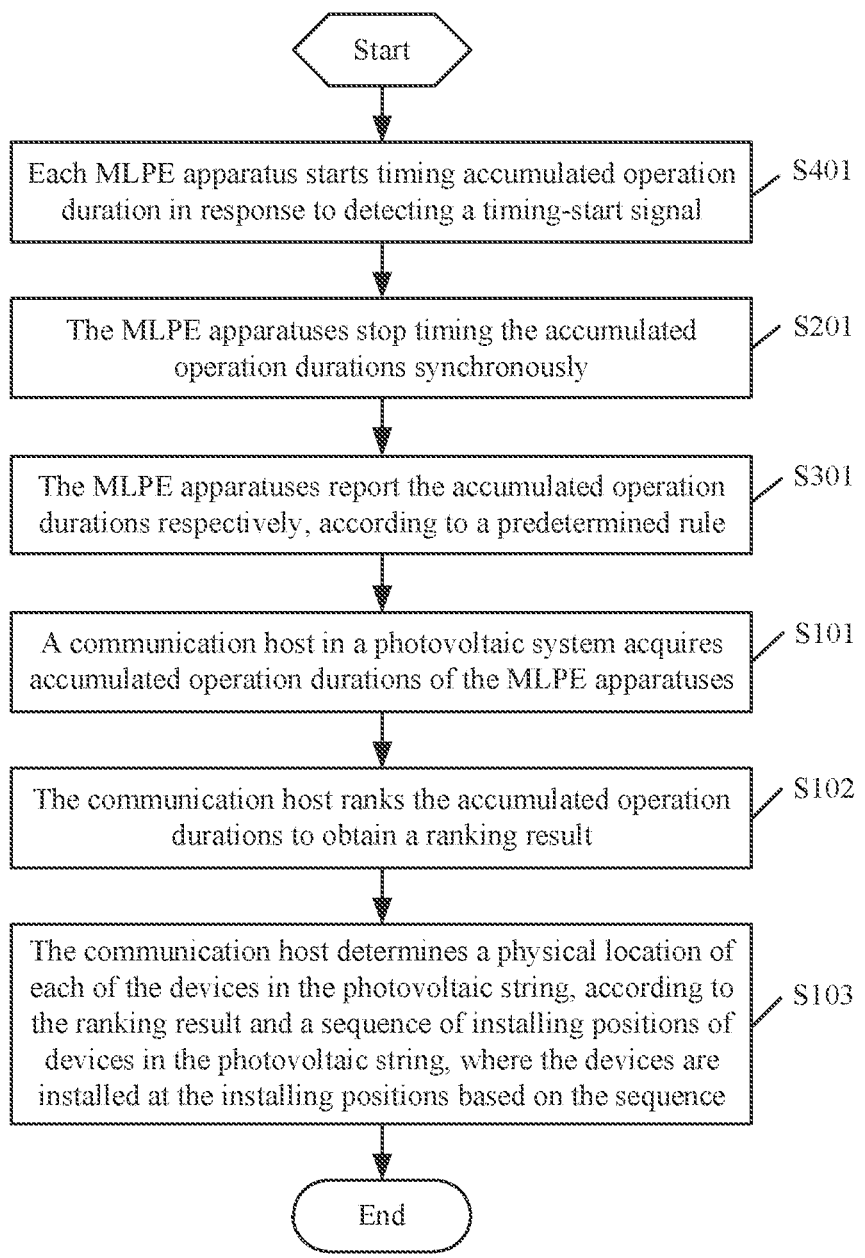
FIG. 10 is a flowchart of another method for locating devices in a photovoltaic string according to an embodiment of the present disclosure.

A method for locating devices in a photovoltaic string is further provided according to another embodiment of the present disclosure. After the MLPE apparatuses stop timing the accumulated operation durations synchronously and before the communication host in the photovoltaic system acquires the accumulated operation durations of the MLPE apparatuses, the method further includes step S301, in order to avoid a conflict of signals when the MLPE apparatuses report the accumulated operation durations. Reference is made to FIG. 10.

In step S301, the MLPE apparatuses report the accumulated operation durations respectively, according to a predetermined rule.

Each MLPE apparatus reports the respective accumulated operation duration actively to the communication host in the photovoltaic system, after stopping timing the accumulated operation duration. The MLPE apparatuses may report the accumulated operation durations respectively according to the predetermined rule, such that the signal conflict among the MLPE apparatuses is less probable. The predetermined rule may be determined as follows.

In a first manner, each MLPE apparatus waits for a random period after stopping timing the respective accumulated operation duration, and then reports the respective accumulated operation duration. The MLPE apparatuses may correspond to the random periods different from each other. There may be a small quantity of MLPE apparatuses correspond to identical random periods, which would not result in a severe signal conflict.

In a second manner, each MLPE apparatus reports waits for a corresponding preset period after stopping timing the respective accumulated operation duration, and then reports the respective accumulated operation duration. The preset period may be acquired based on the accumulated operation duration of the MLPE apparatus. For example, a value of the predetermined period may be in correlation (positive correlation or negative correlation) with the accumulated operation duration of the corresponding MLPE apparatus. As an example, each MLPE apparatus may report the respective accumulated operation duration actively after waiting for T from the timing being stopped. T may be determined on requirement, for example, equal to the accumulated operation duration divided by 3600. In such case, assuming that the accumulated operation durations of the MLPE apparatuses #1 and #2 are 62'33" and 57'15", respectively, the moments at which the MLPE apparatuses #1 and #2 report the accumulated operation duration actively are 62'33"/3600=1.0425" and 57'15"/3600=0.9542, respectively, from the timing being stopped. Other cases can be obtained by analogy. The MLPE apparatuses report the respective accumulated operation durations at different moments, since the respective accumulated operation durations of the MLPE apparatuses are different from each other. Alternatively, a value of the preset period may be in correlation with a serial number of the corresponding MLPE apparatus. For example, the serial number (or part of the serial number) of the MLPE apparatus is converted through calculation into a moment at which the MLPE apparatus reports the respective accumulated operation duration actively. The calculated moments for reporting the accumulated operation durations are different for the MLPE apparatuses, since the serial numbers of the MLPE apparatuses are different from each other.

In a third manner, in response to one of the MLPE apparatuses reporting the accumulated operation duration of its own, each remaining MLPE apparatus determines a respective reporting time based on a difference in the respective accumulated operation duration between the one of the MLPE apparatuses and said remaining MLPE apparatus. In one embodiment, after any of the MLPE apparatuses reports the accumulated operation duration thereof first, each of the remaining MLPE apparatuses receives and parses such accumulated operation duration to acquire a difference in the accumulated operation duration between itself and the MLPE apparatus reporting first. Then, a reporting time of such remaining MLPE apparatus is determined based on such difference. For example, after an MLPE apparatus #1 reports the respective accumulated operation duration, an MLPE apparatus #2 calculates a difference between the accumulated operation duration of the MLPE apparatus #2 and the accumulated operation duration of the MLPE apparatus #1, where the difference is equal to 7'24". Accordingly, the MLPE apparatus #2 may report the respective accumulated operation duration after waiting for 7'24"/360=1.233".

The above three manners are only part of examples, and the present disclosure is not limited thereto. Any predetermined rule which can avoid the signal conflict among the MLPE apparatuses when reporting the accumulated operation durations falls within the protection scope of the present disclosure.

Other principles may refer to the description of the aforementioned embodiments, and are not repeated herein.

Figure 11:
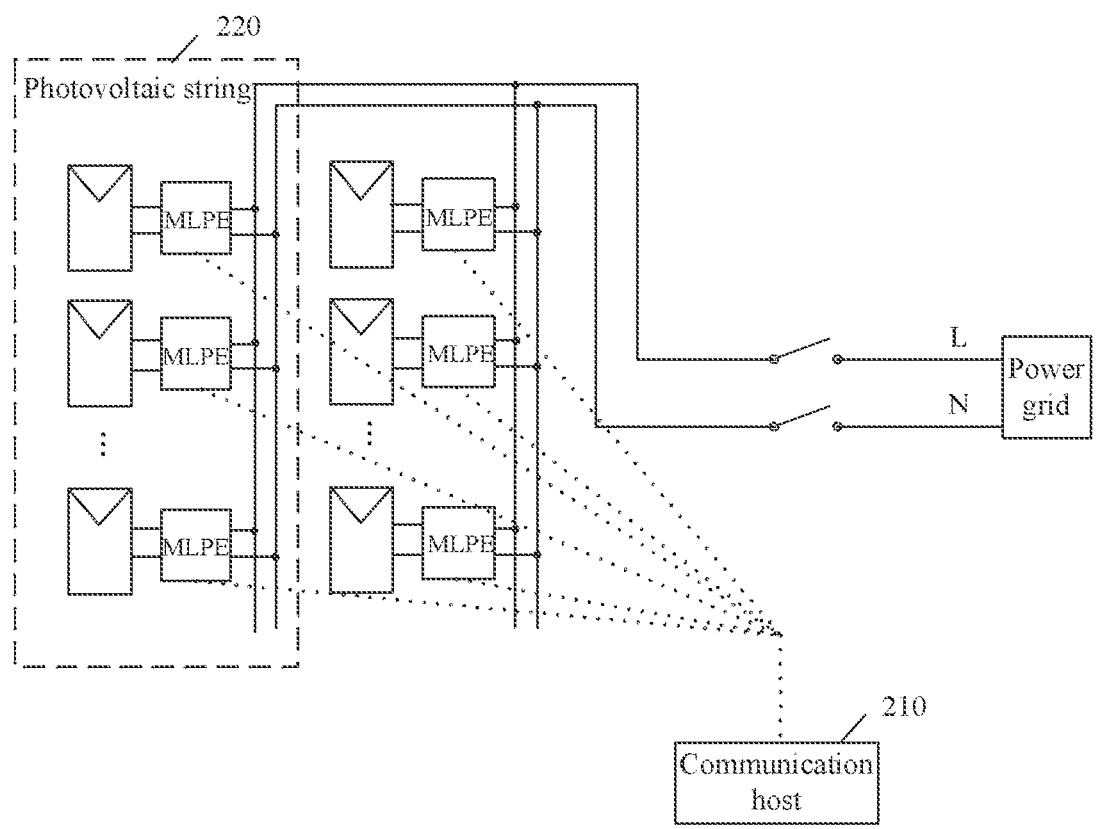
FIG. 11 is a schematic structural diagram of a photovoltaic system according to an embodiment of the present disclosure.

A photovoltaic system is further provided according to an embodiment of the present disclosure. A schematic structural diagram of the system is as shown in FIG. 11. The system includes a communication host 110 and at least one photovoltaic string 120.

Figure 14:
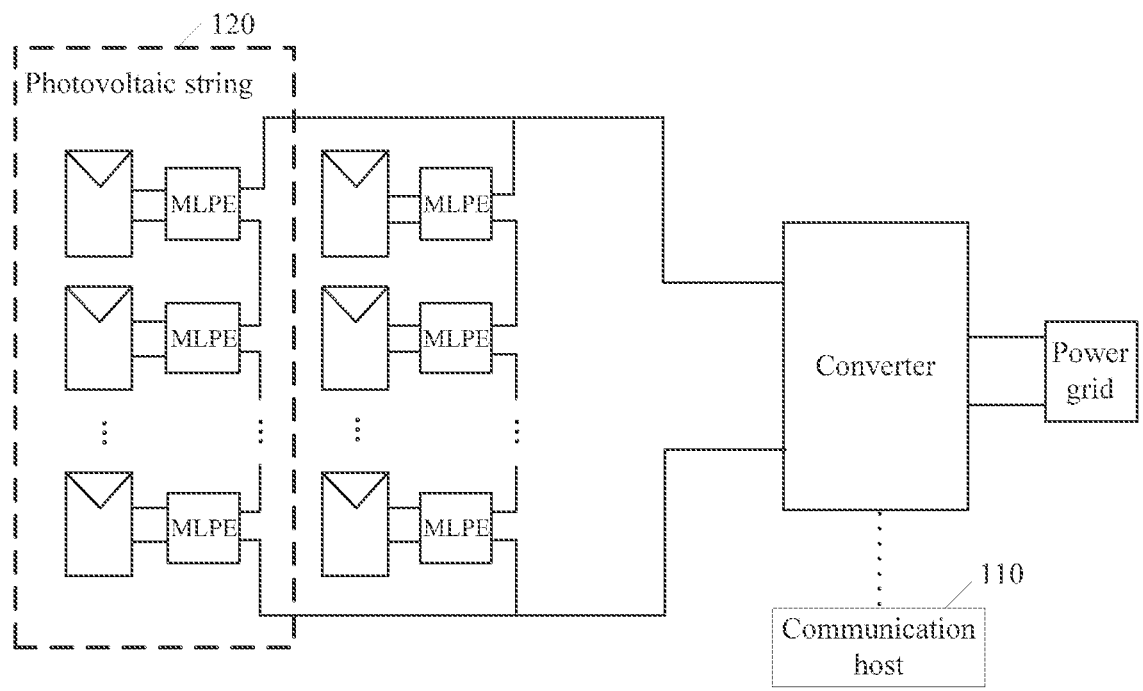
FIG. 14 is a schematic structural diagram of a photovoltaic system provided with a converter according to an embodiment of the present disclosure.

The photovoltaic string 120 includes multiple photovoltaic modules that are connected in parallel (as shown in FIG. 1*l*) or in series (as shown in FIG. 14) via corresponding MLPE apparatuses. The communication host 110 is communication connection with the MLPE apparatuses, and is configured perform any aforementioned method for locating the devices in the photovoltaic string.

Figure 12:
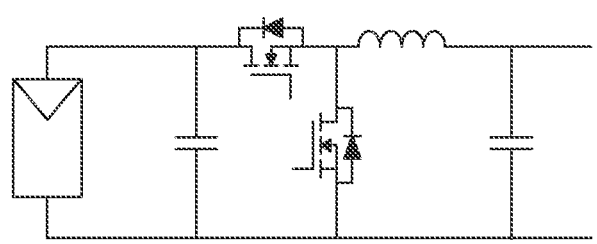
FIG. 12 is a schematic structural diagram of a buck-type optimizer serving as an MLPE apparatus in a photovoltaic system according to an embodiment of the present disclosure.
Figure 13:
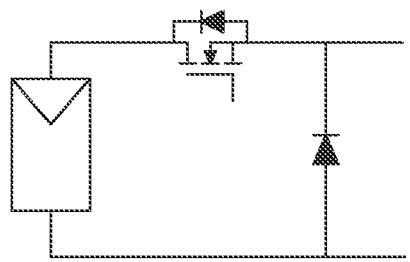
FIG. 13 is a schematic structural diagram of a rapid shutdown device serving as an MLPE apparatus in a photovoltaic system according to an embodiment of the present disclosure.

In practice, the MLPE apparatuses of the photovoltaic string 120 may be: a power optimizer configured to perform maximum power point tracking (MPPT) on a photovoltaic module, a rapid shutdown device configured to switch on and off a photovoltaic module, or a module monitor. In such cases, outputs of the MLPE apparatuses in a same photovoltaic string are connected in series. The power optimizer includes a direct-current (DC) power optimizer or an alternating-current (AC) power optimizer. The DC power optimizer converts a low-voltage DC input into a low-voltage DC output, and the low-voltage DC outputs are connected in series to acquire a high-voltage DC output. The AC power optimizer converts a low-voltage DC input into a low-voltage AC output, and the low-voltage AC outputs are connected in series to acquire a high-voltage AC output. The MLPE apparatus may alternatively be a micro inverter. In such case, outputs of the MLPE apparatuses in a same photovoltaic string are connected in parallel. The present disclosure is not limited to the above examples. Reference is made to FIG. 12 and FIG. 13, which show schematic structures of a Buck optimizer and a rapid shutdown device, respectively.

In case of the micro inverter, outputs of the MLPE apparatus may be directly connected into a power grid, and there may be no converter in a post-stage of the MLPE apparatus (as shown in FIG. 11). In case of the Buck optimizer or the rapid shut down device, it is necessary to arrange a converter in a post-stage of the MLPE apparatus, so as to receive and convert power from the photovoltaic string (as shown in FIG. 14). The converter may be a DC-DC converter or a DC-AC converter, for example, a photovoltaic inverter or an energy-storage current transformer. The present disclosure is not limited to the above examples. In case of the AC optimizers, low-voltage AC outputs of the MLPE apparatus are connected in series to form a high-voltage AC output, which may be directly connected into a power grid. In such case, the converter in the post-stage of the MLPE apparatus as shown in FIG. 14 may not be necessary.

The communication host 110 may be a controller in the photovoltaic system, such as an independent system controller or an internal controller of a converter. Alternatively, the communication host 110 may be a near-end controller in communication connection with a controller in the photovoltaic system, such as a local personal computer (PC). Alternatively, the communication host 110 may be a remote server, a cloud server, or a display terminal (such as a mobile phone), which in communication connection with any aforementioned controller. In practice, the communication host 110 may be located or integrated in any device in the photovoltaic system, such as a controller of an MLPE device or a controller of an inverter. The present disclosure is not limited to the above examples.

The communication host 110 and each MLPE apparatus may communicate with each other through wired communication (for example, under RS485 standards or the Ethernet technology), wireless communication (for example, under WIFI, Bluetooth, ZigBee, or LoRa), or a power line carrier communication, all of which fall within the protection scope of the present disclosure.

In addition, other principles may refer to the description of the aforementioned embodiments and are not repeated herein.

In embodiments of the present disclosure, the photovoltaic string is a part of a photovoltaic array, and further a part of a photovoltaic system. Hence, the aforementioned device in the photovoltaic string may be regarded as a device in the photovoltaic array or a device in the photovoltaic system. The method for locating the devices in the photovoltaic string may be regarded as a method for locating devices in the photovoltaic array, or a method for locating devices in the photovoltaic system.

The embodiments of the present disclosure are described in a progressive manner, and each embodiment places emphasis on the difference from other embodiments. Therefore, one embodiment can refer to other embodiments for the same or similar parts. Since the systems disclosed in the embodiments correspond to the methods disclosed in the embodiments, the description of the systems is simple, and reference may be made to the relevant part of the methods. The systems and embodiments of the systems described herein are merely illustrative. Units described as separate components may be or may not be physically separated. Components shown as units may be or may not be physical units, that is, they may be located in one location or may be distributed among multiple network units. A part or all of the modules may be selected based on an actual condition, in order to implement technical solutions of the present disclosure. Those skilled in the art can understand and carry out the technical solutions without any creative effort.

As further be appreciated by those skilled in the art, the units and algorithmic steps in the examples described according to the embodiments disclosed herein can be implemented in forms of electronic hardware, computer software or the combination of the both. To illustrate the interchangeability of the hardware and the software clearly, the components and the steps in the examples are described generally according to functions in the above description. Whether hardware or software is used to implement the functions depends on a specific application and design constraints for the technical solution. For each specific application, different methods may be used by those skilled in the art to implement the described function, and such implementation should not be considered to depart from the scope of this invention According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. A method for locating devices in a photovoltaic string, comprising:
acquiring, by a communication host in a photovoltaic system, accumulated operation durations of MLPE apparatuses;
ranking, by the communication host, the accumulated operation durations to obtain a ranking result; and
determining, by the communication host, a physical location of each of the devices in the photovoltaic string, according to the ranking result and a sequence of installing positions of the devices in the photovoltaic string, wherein the devices are installed at the installing positions based on the sequence.

2. The method according to claim 1, wherein before the communication host acquiring the accumulated operation durations of all MLPE apparatuses, the method further comprises:
stopping, by the MLPE apparatuses synchronously, timing the accumulated operation durations.

3. The method according to claim 2, wherein stopping, by the MLPE apparatuses synchronously, timing the accumulated operation durations comprises:
stopping, by the MLPE apparatuses synchronously, timing the accumulated operation durations in response to detecting a timing-stop signal.

4. The method according to claim 3, wherein the timing-stop signal is at least one of:
a change in an output voltage, a change in an output current, a short-circuit connection, or a preset communication signal.

5. The method according to claim 4, wherein the timing-stop signal is generated by a converter, a switch device, a synchronization device, the communication host, or a power grid, which is in a post-stage of the MLPE apparatuses of the photovoltaic system.

6. The method according to claim 4, wherein the timing-stop signal is the short-circuit connection, and is generated by shorting a converter, shorting a switch device, or shorting the photovoltaic string.

7. The method according to claim 3, wherein after the MLPE apparatuses stopping timing the accumulated operation durations synchronously, the method comprises:
determining, by the MLPE apparatuses, whether a timing-start signal is detected;
resuming, by the MLPE apparatuses, timing the accumulated operation durations in response to determining that the timing-start signal is detected; and
stopping, by the MLPE apparatuses synchronously, timing the accumulated operation durations in response to determining that the timing-stop signal is detected again.

8. The method according to claim 1, wherein before the communication host acquiring the accumulated operation durations of the MLPE apparatuses, the method further comprises:
starting, by each MLPE apparatus, timing the accumulated operation duration in response to detecting a timing-start signal.

9. The method according to claim 8, wherein each MLPE apparatus detects the timing-start signal by at least one of:
detecting a predetermined electric change,
being subject to a predetermined mechanical change, or
receiving a preset signal through communication.

10. The method according to claim 9, wherein the predetermined electric change comprises:
being powered,
a change of an electric parameter at an input terminal, or
a change of an electric parameter at an output terminal.

11. The method according to claim 9, wherein the predetermined mechanical change comprises:
a predetermined component being installed or removed,
a predetermined component being connected or disconnected, or
a state of a predetermined component being changed.

12. The method according to claim 9, wherein the preset signal is a signal for activating said MLPE apparatus.

13. The method according to claim 2, wherein after the MLPE apparatuses stopping synchronously timing the accumulated operation durations and before the communication host acquiring the accumulated operation durations of the MLPE apparatuses, the method further comprises:
reporting, by the MLPE apparatuses, the accumulated operation durations respectively according to a predetermined rule.

14. The method according to claim 13, wherein the predetermined rule is a sequence determined by:
each MLPE apparatus waiting for a random period after stopping timing the respective accumulated operation duration.

15. The method according to claim 13, wherein the predetermined rule is a sequence determined by:
each MLPE apparatus waiting for a corresponding preset period after stopping timing the respective accumulated operation duration.

16. The method according to claim 15, wherein the corresponding preset period is determined by:
the respective accumulated operation duration of said MLPE apparatus, or a serial number of said MLPE apparatus.

17. The method according to claim 13, wherein the predetermined rule is a sequence determined by:
in response to the respective accumulated operation duration of one of the MLPE apparatuses being reported, each remaining MLPE apparatus determining a respective reporting time based on a difference in the respective accumulated operation duration between the one of the MLPE apparatuses and said remaining MLPE apparatus.

18. The method according to claim 1, wherein the devices in the photovoltaic string are photovoltaic modules, or the MLPE apparatuses in a post-stage of photovoltaic modules.

19. A photovoltaic system, comprising:
a communication host; and
at least one photovoltaic string,
wherein the photovoltaic string comprises a plurality of photovoltaic modules that are connected in parallel or in series via corresponding MLPE apparatuses; and
wherein the communication host is in communication connection with the MLPE apparatuses, and is configured to perform the method according to claim 1.

20. The photovoltaic system according to claim 19, wherein:
outputs of the MLPE apparatuses in one of the at least one photovoltaic string are connected in parallel, and the MLPE apparatuses are micro inverters; or
outputs of the MLPE apparatuses in one of the at least one photovoltaic string are connected in series, the MLPE apparatuses are power optimizers, rapid shutdown devices or module monitors, and the photovoltaic system further comprises a converter, which is configured to receive and convert power from the at least one photovoltaic string.

* * * * *